(12) United States Patent
Kitagawa et al.

(10) Patent No.: US 11,167,368 B2
(45) Date of Patent: Nov. 9, 2021

(54) WELDING DEVICE AND WELDING METHOD

(71) Applicant: MAYEKAWA MFG. CO., LTD., Tokyo (JP)

(72) Inventors: Hisashi Kitagawa, Tokyo (JP); Yoshiyuki Oomasa, Tokyo (JP); Hideki Shudai, Tokyo (JP); Yoshihiko Ueno, Tokyo (JP); Daisuke Miyazaki, Tokyo (JP); Masato Takeda, Tokyo (JP); Toshinori Ohtomo, Tokyo (JP); Toshikazu Kamae, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 461 days.

(21) Appl. No.: 16/313,158

(22) PCT Filed: Oct. 7, 2016

(86) PCT No.: PCT/JP2016/080004
§ 371 (c)(1),
(2) Date: Dec. 26, 2018

(87) PCT Pub. No.: WO2018/066136
PCT Pub. Date: Apr. 12, 2018

(65) Prior Publication Data
US 2019/0151977 A1    May 23, 2019

(51) Int. Cl.
*B23K 9/12* (2006.01)
*B23K 9/127* (2006.01)
(Continued)

(52) U.S. Cl.
CPC ............ *B23K 9/1274* (2013.01); *B23K 9/032* (2013.01); *B23K 9/0956* (2013.01); *B23K 9/127* (2013.01); *B23K 26/08* (2013.01); *F28F 3/10* (2013.01)

(58) Field of Classification Search
CPC . B23K 5/003; B23K 5/02; B23K 5/22; B23K 9/02; B23K 9/0956; B23K 9/1274;
(Continued)

(56) References Cited

U.S. PATENT DOCUMENTS 4,660,753 A * 4/1987 Kushibe ................. B23K 9/028
228/48
4,843,904 A * 7/1989 Moore ............... B23K 37/0461
74/396

(Continued)

FOREIGN PATENT DOCUMENTS

EP    1619567    1/2006
EP    1731259    12/2006
(Continued)

OTHER PUBLICATIONS

"Office Action of Europe Counterpart Application, Application No. 16918332.4-1002", dated Jun. 23, 2020, p. 1-p. 5.
(Continued)

*Primary Examiner* — Brian W Jennison
(74) *Attorney, Agent, or Firm* — JCIPRNET

(57) ABSTRACT

According to some embodiments, there is provided a welding device for welding outer peripheral edges of two irregular shaped plates which are overlapped, including: a rotary table to which the two irregular shaped plates in an overlapped state are fixed; a torch unit, including a welding torch positioned to face the outer peripheral edges of the two irregular shaped plates fixed to the rotary table; a first torch actuator, capable of changing an orientation and a distance of the welding torch relative to the outer peripheral edges; and a first controller, configured to control the first torch actuator, so that the orientation of the welding torch relative to a tangential line of the outer peripheral edges and the distance of the welding torch from the outer peripheral edges are kept constant along a circumferential direction of the (Continued)

outer peripheral edges, during rotation of the two irregular shaped plates.

8 Claims, 7 Drawing Sheets

(51) Int. Cl.
*B23K 9/095* (2006.01)
*B23K 26/08* (2014.01)
*B23K 9/032* (2006.01)
*F28F 3/10* (2006.01)

(58) Field of Classification Search
CPC ........ B23K 9/164; B23K 9/291; B23K 9/325; B23K 9/126; B23K 9/127; B23K 9/28; B23K 9/032; B23K 26/08; B23K 2101/14
See application file for complete search history.

(56) References Cited

U.S. PATENT DOCUMENTS

| | | | | |
|---|---|---|---|---|
| 5,571,430 | A * | 11/1996 | Kawasaki | B23K 26/082 219/121.78 |
| 6,403,921 | B1 * | 6/2002 | Maeda | H02K 3/12 219/125.11 |
| 6,622,906 | B1 * | 9/2003 | Kushibe | B23K 37/04 219/124.31 |
| 8,097,825 | B2 * | 1/2012 | Sato | B23K 35/0244 219/64 |
| 9,162,325 | B2 * | 10/2015 | Furuta | B23K 37/0461 |
| 9,855,621 | B2 * | 1/2018 | Isobe | B23K 37/0241 |
| 10,232,468 | B2 * | 3/2019 | Furuya | B23K 26/0892 |
| 10,792,748 | B2 * | 10/2020 | Kitagawa | B23K 5/22 |
| 2006/0278622 | A1 * | 12/2006 | Inoue | B23K 37/0452 219/125.1 |
| 2014/0080690 | A1 * | 3/2014 | Noma | B23Q 16/06 483/55 |
| 2016/0067827 | A1 * | 3/2016 | Zediker | B23K 26/144 219/76.12 |

FOREIGN PATENT DOCUMENTS

| | | |
|---|---|---|
| JP | S5075149 | 6/1975 |
| JP | 09-150269 | 6/1997 |
| JP | 10-244368 | 9/1998 |
| JP | 50-075149 | 11/2012 |
| JP | 5690532 | 3/2015 |

OTHER PUBLICATIONS

GSI SLV, "MIG-/MAG and Flux-cored Welding III", SFI Aktuell(training material for International Welding Engineers, with English translation thereof, Dec. 31, 2009, pp. 1-16.

"Search Report of Europe Counterpart Application", dated Jul. 19, 2019, pp. 1-12.

Office Action of Japan Counterpart Application, with English translation thereof, dated Aug. 13, 2019, pp. 1-10.

"Office Action of Korea Counterpart Application," with English translation thereof, dated Oct. 25, 2019, p. 1-p. 9.

"English translation of the international preliminary report on patentability", dated Feb. 5, 2019, which is the English translation of "Written Opinion of the International Searching Authority (Form PCT/ISA/237) of PCT/JP2016/080004," dated Oct. 27, 2016, pp. 1-15.

"International Search Report (Form PCT/ISA/210)" of PCT/JP2016/080004, dated Nov. 8, 2016, with English translation thereof, pp. 1-3.

* cited by examiner

WELDING DEVICE AND WELDING METHOD

CROSS-REFERENCE TO RELATED APPLICATION

This application is a 371 of international application of PCT application serial no. PCT/JP2016/080004, filed on Oct. 7, 2016. The entirety of the abovementioned patent applications is hereby incorporated by reference herein and made a part of this specification.

TECHNICAL FIELD

The present disclosure relates to a welding device and a welding method for welding outer peripheral edges of irregular shaped plates having a length from the center to the outer peripheral edge varying in the circumferential direction.

BACKGROUND ART

As described in Patent Document 1, in a heat exchanging part of a shell-and-plate type heat exchanger, numerous plates with the same shape are overlapped, and adjacent plates are welded along their outer peripheral edges so that a refrigerant flow path is formed between the plates.

The heat exchanging part of the shell-and-plate type heat exchanger disclosed in Patent Document 1 is constituted by numerous overlapped perfect-circular plates.

CITATION LIST

Patent Literature

Patent Document 1: JP5690532B

SUMMARY

Problems to be Solved

Welding the outer peripheral edges of the plates constituting the heat exchanging part needs to eliminate welding defects due to lack of penetration along the circumferential direction of the outer peripheral edges. The penetration depth varies with the orientation of a welding torch used for welding relative to the outer peripheral edges, the distance between the welding torch and a welded portion, and the heating time. To eliminate the lack of penetration in the circumferential direction, the welding torch is required to be operated in accordance with setting conditions.

In a case of using perfect-circular plates, the welding torch is positioned in a certain orientation relative to outer peripheral edges of the plates while the plates are rotated around the plate center at a constant speed, so that a uniform penetration depth can be obtained.

However, in a case of welding outer peripheral edges of irregular shaped plates, the length of which from the center to the outer peripheral edge varies in the circumferential direction, the same welding method as used for the perfect-circular plates causes, even if the irregular shaped plates are rotated at a constant speed, variation in the passing speed of the welding torch between a portion where the outer peripheral edge is an arc with a large curvature and a portion where the outer peripheral edge is an arc with a small curvature; i.e., the passing speed is relatively high when the arc has a large curvature.

Thus, a uniform penetration depth cannot be obtained in the circumferential direction of the outer peripheral edges.

An object of some embodiments is to reduce welding defects due to the lack of penetration when outer peripheral edges of overlapped irregular shaped plates are welded.

Solution to the Problems (1) A welding device according to some embodiments is a welding device for welding outer peripheral edges of two irregular shaped plates which are overlapped, and the welding device including:

a rotary table to which the two irregular shaped plates in an overlapped state are fixed;

a torch unit, including a welding torch positioned to face the outer peripheral edges of the two irregular shaped plates fixed to the rotary table;

a first torch actuator, capable of changing an orientation of the welding torch relative to the outer peripheral edges and a distance of the welding torch from the outer peripheral edges; and a first controller, configured to control the first torch actuator, so that the orientation of the welding torch relative to a tangential line of the outer peripheral edges and the distance of the welding torch from the outer peripheral edges are kept constant along a circumferential direction of the outer peripheral edges during rotation of the two irregular shaped plates.

Herein, the "irregular shaped plate" refers to a plate having a length from the rotation center, when the plate is fixed to a rotary table, to the outer peripheral edge varying in the circumferential direction. For instance, the outer peripheral edge of this plate is not composed of an arc having the same curvature in the circumferential direction like a perfect circle but has different curvatures in the circumferential direction. For instance, a plate having an ellipsoidal shape is included, but it is not limited to a shape composed of only arc, such as an ellipse.

In the above configuration (1), the outer peripheral edges of the irregular shaped plates fixed to the rotary table and rotated are welded by the welding torch. During this operation, the first controller controls the first torch actuator so that the orientation of the welding torch relative to a tangential line of the outer peripheral edges of the two irregular shaped plates which are overlapped and the distance of the welding torch from the outer peripheral edges are kept constant along a circumferential direction of the outer peripheral edges. Thus, it is possible to make the penetration depth of the outer peripheral edges uniform in the circumferential direction and reduce welding defects due to the lack of penetration.

Moreover, since the rotary table only needs to be rotated at a constant speed, it is possible to simplify an actuator of the rotary table and reduce the cost. Further, since the welding torch does not need to move in the circumferential direction of the outer peripheral edges and is basically placed at a fixed position, it is unnecessary to provide an actuator for moving the welding torch in the circumferential direction of the outer peripheral edges and it is possible to reduce the cost.

(2) In an embodiment, in the above configuration (1), the first controller is configured to control an orientation displacement speed (orientation displacement per unit time, i.e., orientation change rate) of the welding torch relative to the outer peripheral edges, so that a heating time for heating each of portions of the outer peripheral edges by the welding torch is constant.

In the above configuration (2), the orientation displacement speed of the welding torch relative to the outer peripheral edges is controlled so that the heating time by the welding torch is constant among the portions of the outer peripheral edges. Thus, it is possible to make the penetration depth uniform in the circumferential direction of the outer peripheral edges and reduce welding defects due to the lack of penetration.

A relative orientation displacement speed of the welding torch relative to the outer peripheral edges can be relatively easily controlled by changing the orientation of the welding torch in the same direction or opposite direction to the rotational direction of the rotary table.

(3) In an embodiment, in the above configuration (2), the first controller has:

a torch posture map, in which a position and an orientation of the welding torch are described by a coordinate at a setting position of each of regions of the outer peripheral edges, for each of the regions, in a two-dimensional coordinate system whose origin is a rotation center of the two irregular shaped plates, the regions at least having different curvatures of the outer peripheral edges in a circumferential direction of the irregular shaped plates, wherein the orientation is set so as to have an identical angle with respect to a tangential line of the outer peripheral edges at all of the regions; and a torch orientation displacement speed map in which the orientation displacement speed of the welding torch is set so that a heating time by the welding torch is constant among respective setting positions of the regions, and the first controller is configured to control the first torch actuator, based on the torch posture map and the torch orientation displacement speed map.

In the torch posture map, the position and the orientation of the welding torch are described by a coordinate at a setting position of each of regions, having different curvatures, of the outer peripheral edges to be welded, for each of the regions. Thus, the penetration depth can be easily controlled along the circumferential direction of the outer peripheral edges. Further, since the orientation of the welding torch relative to the outer peripheral edges is set so as to have a constant angle along the circumferential direction of the outer peripheral edges, it is possible to reduce welding defects due to the lack of penetration along the circumferential direction of the outer peripheral edges.

In the torch orientation displacement speed map, the orientation displacement speed of the welding torch is set so that the heating time by the welding torch is constant. Thus, it is possible to make the penetration depth uniform along the circumferential direction of the outer peripheral edges and reduce welding defects due to the lack of penetration.

(4) In an embodiment, in the above configuration (3), in the torch posture map, a tip of the welding torch is described by a coordinate at an intersection point between y-axis of the two-dimensional coordinate system and the outer peripheral edges, and an imaginary circle passing through the intersection point is set, and the orientation of the welding torch is set so as to have a constant angle with respect to a normal line passing through the intersection point and a center point of the imaginary circle.

In the above configuration (4), the tip of the welding torch is described by a coordinate at the intersection point, which allows the first controller to perform a control so that the tip of the welding torch is always located at the intersection point at any circumferential position of the irregular shaped plates. Thus, it is possible to easily set the positioning of the welding torch. Further, since the orientation of the welding torch is set so as to have a constant angle with respect to the normal line, the welding torch can be orientated so as to have a constant angle with respect to the tangential line of the outer peripheral edges always.

In actual welding, the tip of the welding torch is disposed at a position shifted outside of the irregular shaped plates by a minute distance from the intersection point.

(5) In an embodiment, in the above configuration (4), the orientation of the welding torch is set so as to coincide with the normal line.

In the above configuration (5), the welding torch is aligned with the normal line so that the welding torch is located orthogonal to the tangential line of the outer peripheral edges. This maximizes heat input of the outer peripheral edges and maximizes the penetration depth of the outer peripheral edges. Thus, it is possible to reduce welding defects due to the lack of penetration.

(6) In an embodiment, in any one of the above configurations (1) to (5), the welding device further comprises:

a second torch actuator, capable of moving the welding torch in a direction intersecting front and rear surfaces of the two irregular shaped plates;

a third torch actuator, capable of changing the distance of the welding torch from the outer peripheral edges;

a non-contact sensor, configured to detect an overlapped position in the direction intersecting the front and rear surfaces of the two irregular shaped plates and detect the distance of the welding torch from the outer peripheral edges; and a second controller, configured to control the second actuator and the third actuator so that a position of the welding torch is matched with the overlapped position in the direction intersecting the front and rear surfaces, and the distance attains a setting value, based on a detection value of the non-contact sensor.

In the above configuration (6), the welding torch can always be positioned at the overlapped position of the outer peripheral edges by the feedback control by the second controller. Thus, heat input for the weld is ensured, and the distance of the welding torch from the outer peripheral edges of the irregular shaped plates can be always kept at a setting value.

Consequently, it is possible to overcome the lack of penetration of the weld.

A single controller may have both the functions of the first controller and the second controller.

(7) In an embodiment, in the above configuration (6), the non-contact sensor is a laser displacement sensor, and the second controller is configured to compare the detection value with a master shape stored in the second controller to detect the overlapped position and the distance between the welding torch and the outer peripheral edges.

In the above configuration (7), the use of the laser displacement sensor, as the non-contact sensor, with laser light which is not disturbed by disturbance such as welding light improves detection accuracy.

(8) In an embodiment, in any one of the above configurations (1) to (7), the first controller is configured to control the orientation displacement speed of the welding torch, so that a heating time for heating a portion where stress concentration occurs is exceptionally longer than other portions of the outer peripheral edges.

In the above configuration (8), the orientation displacement speed of the welding torch is controlled so that a heating time of a potion where stress concentration occurs is exceptionally longer than that of other portions of the outer peripheral edges. Thus, the penetration depth at this portion can be made exceptionally longer. Consequently, it is possible to improve the strength of the weld in the stress concentration portion.

(9) A welding method according to some embodiments is a welding method for welding outer peripheral edges of two irregular shaped plates which are overlapped, and the welding method including:

a first step of fixing the two irregular shaped plates in an overlapped state to a rotary table and rotating the two irregular shaped plates in the overlapped state at a constant rotational speed;

a second step of welding the outer peripheral edges of the two irregular shaped plates along a circumferential direction by a welding torch positioned to face the outer peripheral edges of the two irregular shaped plates; and a third step of performing a control so that an orientation of the welding torch relative to a tangential line of the outer peripheral edges and a distance of the welding torch from the outer peripheral edges are kept constant along a circumferential direction of the outer peripheral edges in the second step.

According to the above method (9), in the third step, the orientation of the welding torch relative to a tangential line of the outer peripheral edges of the irregular shaped plates which are overlapped and the distance of the welding torch from the outer peripheral edges are controlled so as to be constant along the circumferential direction of the outer peripheral edges. Thus, it is possible to reduce welding defects due to the lack of penetration along the circumferential direction of the outer peripheral edges.

Moreover, since the rotary table only needs to be rotated at a constant speed, it is possible to simplify an actuator of the rotary table and reduce the cost. Further, since the welding torch does not need to move in the circumferential direction of the outer peripheral edges and is basically placed at a fixed position, it is unnecessary to provide an actuator for moving the welding torch in the circumferential direction of the outer peripheral edges and it is possible to reduce the cost.

(10) In an embodiment, in the above method (9), the third step includes:

setting a position and an orientation of the welding torch at a setting position of each of regions of the outer peripheral edges, for each of the regions at least having different curvatures of the outer peripheral edges in a circumferential direction of the irregular shaped plates, wherein the orientation is set so as to have an identical angle with respect to a tangential line of the outer peripheral edges at all of respective setting positions of the regions; and setting an orientation displacement speed of the welding torch so that a heating time by the welding torch is constant among the respective setting positions of the regions.

According to the above method (10), the position and the orientation of the welding torch are set for each of regions having different curvatures of the outer peripheral edges, and the heating time is constant among the respective setting position of the regions. Thus, it is possible to reduce welding defects due to the lack of penetration of the weld along the circumferential direction of the outer peripheral edges.

(11) In an embodiment, in the above method (9) or (10), the third step includes:

controlling the orientation displacement speed of the welding torch so that a heating time for heating a portion where stress concentration occurs is exceptionally longer than other portions of the outer peripheral edges.

According to the above method (11), the heating time of a potion where stress concentration occurs can be made exceptionally longer. Thus, it is possible to exceptionally increase the penetration depth at the stress concentration portion, and it is possible to improve the strength of the weld of the stress concentration portion.

Advantageous Effects

According to some embodiments, when outer peripheral edges of irregular shaped plates are welded, it is possible to eliminate welding defects due to the lack of penetration along the circumferential direction of the outer peripheral edges. Further, it is possible to simplify the configuration of the welding device which can solve the above problems and reduce the cost.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
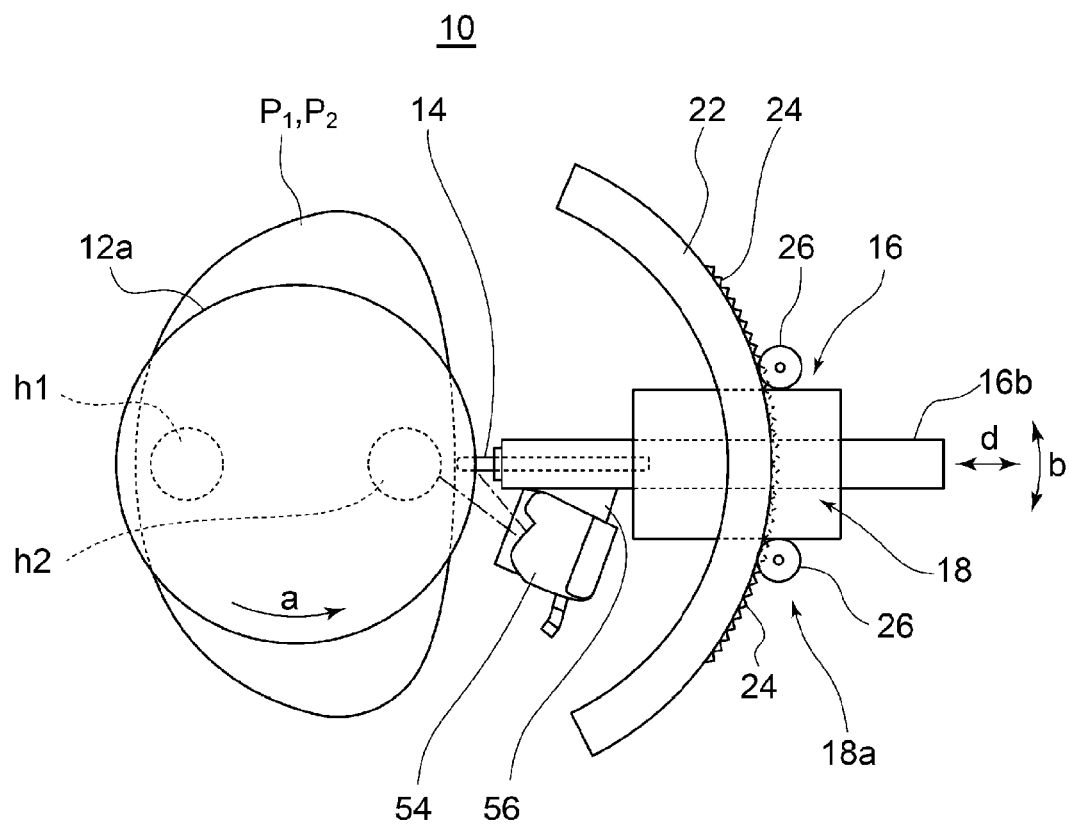
FIG. 1 is a plan view of a welding device according to an embodiment.
Figure 2:
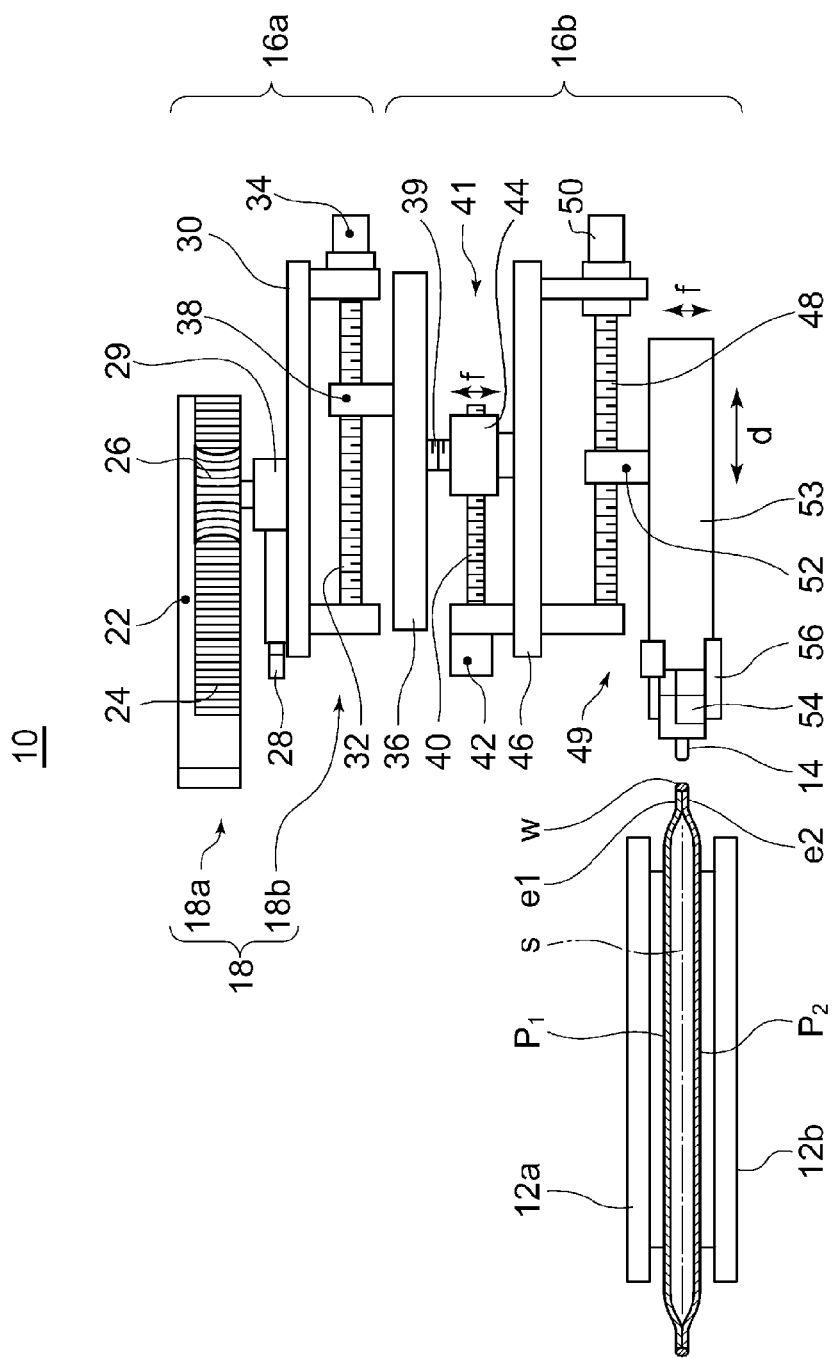
FIG. 2 is a front view of a welding device according to an embodiment.

A welding device 10 according to at least one embodiment includes, as shown in FIGS. 1 and 2, rotary tables 12a and 12b to which two irregular shaped plates $P_1$ and $P_2$ to be welded are rotatably fixed. The irregular shaped plates $P_1$ and $P_2$, which are overlapped, are disposed between the rotary tables 12a and 12b and held between the rotary tables 12a and 12b. The irregular shaped plates $P_1$ and $P_2$ have the same size and the same shape so that their outer peripheral edges e1 and e2 are substantially aligned with each other when they are overlapped.

A welding torch 14 is positioned to face the outer peripheral edges e1 and e2 of the two irregular shaped plates $P_1$ and $P_2$ fixed between the rotary tables 12a and 12b. The welding torch 14 is attached to a torch unit 16.

The welding device further includes a first torch actuator 18 configured to change an orientation of the welding torch 14 relative to the outer peripheral edges e1 and e2 and a distance of the welding torch 14 from the outer peripheral edges e1 and e2.

Figure 3:
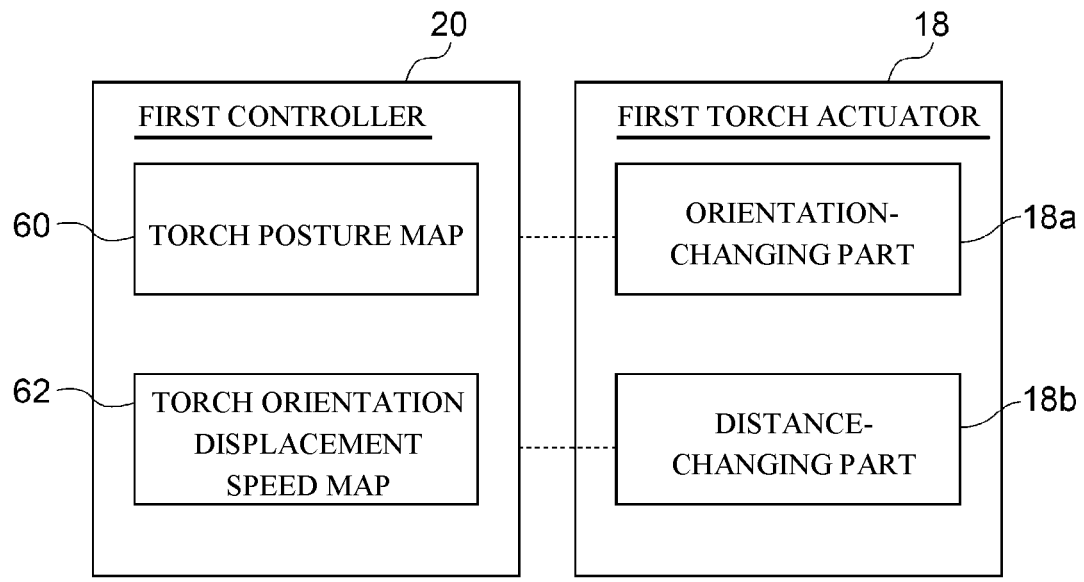
FIG. 3 is a block diagram of a control system of a welding device according to an embodiment.

Further, as shown in FIG. 3, the device includes a first controller 20 configured to control the first torch actuator 18 so that the orientation of the welding torch 14 relative to a tangential line of the outer peripheral edges e1 and e2 of the rotating two rotating irregular shaped plates $P_1$ and $P_2$ and the distance of the welding torch 14 from the outer peripheral edges e1 and e2 are kept constant along the circumferential direction of the outer peripheral edges e1 and e2.

In the above configuration, the outer peripheral edges e1 and e2 of the irregular shaped plates $P_1$ and $P_2$ which are held between the rotary tables 12a and 12b and rotated in a direction shown by the arrow a are welded by the welding torch 14. During this operation, the first controller 20 controls the first torch actuator 18 so that the orientation of the welding torch 14 relative to a tangential line of the outer peripheral edges e1 and e2 of the two irregular shaped plates $P_1$ and $P_2$ which are overlapped and the distance between the welding torch 14 and the outer peripheral edges e1 and e2 are kept constant along the circumferential direction of the outer peripheral edges e1 and e2. Thus, it is possible to reduce welding defects of a weld w due to the lack of penetration of the weld w along the circumferential direction of the outer peripheral edges e1 and e2.

Moreover, since the rotary tables 12a and 12b only need to be rotated at a constant speed, it is possible to simplify an actuator of the rotary tables and reduce the cost. Further, since the welding torch 14 does not need to move in the circumferential direction of the outer peripheral edges e1 and e2 and is basically placed at a fixed position, it is unnecessary to provide an actuator for moving the welding torch 14 in the circumferential direction of the outer peripheral edges and it is possible to reduce the cost.

In an embodiment, as shown in FIGS. 1 and 2, the torch unit 16 to which the welding torch 14 is attached is mounted to a rail 22 in a slidable manner in a longitudinal direction (a direction shown by the arrow b in FIG. 1). The torch unit 16 is composed of a first block 16a provided with the first torch actuator 18 and a second block 16b provided with the welding torch 14.

In an embodiment, as shown in FIGS. 2 and 3, the first torch actuator 18 includes an orientation-changing part 18a configured to change the orientation of the welding torch 14 relative to a tangential line of the outer peripheral edges e1 and e2 and a distance-changing part 18b configured to change the distance of the welding torch 14 from the outer peripheral edges e1 and e2.

In an embodiment, the distance-changing part 18b is capable of changing a distance of the tip of the welding torch 14 from the outer peripheral edges e1 and e2.

In an embodiment, as shown in FIG. 1, the orientation-changing part 18a includes an arc-shaped rail 22. The rail 22 is provided so as to face the outer peripheral edges e1 and e2 and extends along the circumferential direction of the outer peripheral edges. In an embodiment, the distance-changing part 18b can move the tip of the welding torch 14 linearly in a direction (a direction shown by the arrow d in FIG. 1) toward and away from the outer peripheral edges e1 and e2 and thus enables the tip of the welding torch 14 to always be positioned on the outer peripheral edges e1 and e2. By setting the arc center of the rail 22 at one point on the movement line of the tip of the welding torch 14 and on the outer peripheral edges, the orientation of the welding torch 14 relative to the outer peripheral edges e1 and e2 can be changed while the tip of the welding torch 14 is aligned with this point.

In actual welding, the tip of the welding torch 14 is disposed at a position shifted outside by a minute distance from the outer peripheral edges e1 and e2.

In an embodiment, as shown in FIG. 2, the orientation-changing part 18a includes a rack 24 provided on the surface of the rail 22, a pinion 26 engaged with the rack 24, and an actuator 28 provided in the torch unit 16 for driving the pinion 26. When the pinion 26 is driven by the actuator 28, the torch unit 16 is moved along a longitudinal direction of the rail 22. The pinion 26 is rotatably supported by a base 29, and the actuator 28 and the base 29 are fixed to a support 30.

In an embodiment, as shown in FIG. 2, the distance-changing part 18b includes a ball screw 32 rotatably supported by the support 30, an actuator 34 provided at the support 30, and a slide block 38 integral with a support 36 and screwed with the ball screw 32. The support 36 forms a part of the second block 16b.

When the ball screw 32 is rotated by the actuator 34, the distance of the tip of the welding torch 14 from the outer peripheral edges e1 and e2 can be changed.

Figure 4:
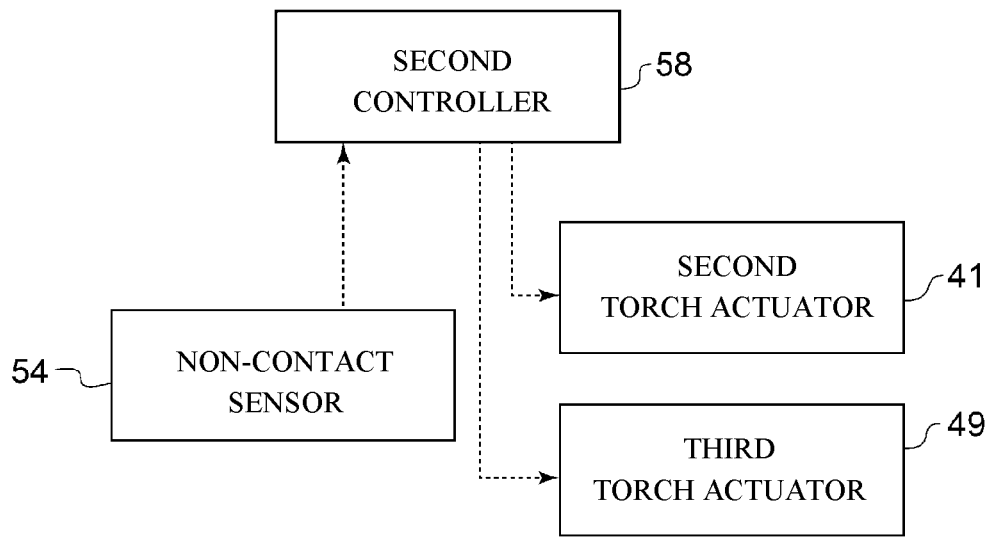
FIG. 4 is a block diagram of a control system of a welding device according to an embodiment.

In an embodiment, as shown in FIGS. 2 and 4, the second block 16b includes a second torch actuator 41 configured to move the welding torch 14 in a direction (e.g., a direction shown by the arrow f in FIG. 2) intersecting with the front and back surfaces of the two irregular shaped plates $P_1$ and $P_2$, and a third torch actuator 49 configured to change the distance of the welding torch 14 from the outer peripheral edges e1 and e2. Further, as shown in FIG. 1, there is provided a non-contact sensor 54 for detecting an overlapped position in the direction intersecting with the front and back surfaces of the two irregular shaped plates $P_1$ and $P_2$ as well as the distance of the welding torch 14 from the outer peripheral edges e1 and e2. A detection result of the non-contact sensor 54 are input into a second controller 58. The second controller 58 controls the second torch actuator 41 so that the position of the welding torch 14 is matched with the overlapped position at which the irregular shaped plates $P_1$ and $P_2$ are stacked in the direction intersecting with the front and back surfaces of the two irregular shaped plates $P_1$ and $P_2$. Further, the second controller 58 controls the third torch actuator 49 so that the distance between the welding torch 14 and the outer peripheral edges e1 and e2 has a setting value.

With the above configuration, the welding torch 14 can always be positioned at the overlapped position of the outer peripheral edges e1 and e2 by the feedback control of the second controller 58. Thus, heat input for the weld w can be ensured. Further, always keeping the distance of the welding torch 14 from the outer peripheral edges e1 and e2 at a setting value overcomes the lack of penetration of the weld w along the circumferential direction of the outer peripheral edges.

A single controller may have all of the functions of the first controller 20 and the second controller 58.

In an embodiment, as shown in FIG. 2, the second torch actuator 41 includes an actuator 42 fixed to a support 46 together with a fixation block 44. The support 36 is supported from below by a screw shaft 39 disposed in the direction shown by the arrow f. In the fixation block 44, the screw shaft 39 and a ball screw 40 are screwed so that they cross, and the actuator 42 rotates the ball screw 40 and the screw shaft 39. The rotation of the screw shaft 39 causes translational motion of the fixation block 44 and the support 46 in a direction (the direction shown by the arrow f) intersecting with a mating surface s between the irregular shaped plates $P_1$ and $P_2$.

In an embodiment, as shown in FIG. 2, the third torch actuator 49 includes an actuator 50 fixed to the support 46 and configured to rotate a ball screw 48. To the ball screw 48 is screwed a slide block 52 fixed to a torch body 53. When the ball screw 48 is rotated, the torch body 53 moves linearly toward and away from the outer peripheral edges e1 and e2.

In an embodiment, as shown in FIG. 2, the non-contact sensor 54 is fixed to the second block 16b via a fixation plate 56. Consequently, the non-contact sensor 54 moves with the welding torch 14 in the direction shown by the arrow b or the direction shown by the arrow d and thus does not require specific movement means.

In an embodiment, each actuator 28, 34, 42, and 50 is composed of a forward and reverse rotatable servo motor and rotated in forward and reverse directions by the first controller 20 and the second controller 58.

In an embodiment, the non-contact sensor 54 is a laser displacement sensor, and the second controller 58 compares a detection value of the laser displacement sensor with a master shape stored in the second controller 58 to detect the overlapped position of the irregular shaped plates $P_1$ and $P_2$ and the distance between of the welding torch 14 from the outer peripheral edges e1 and e2.

The use of the laser displacement sensor, as the non-contact sensor, with laser light which is not disturbed by disturbance such as welding light improves detection accuracy.

In particular, the use of a laser displacement sensor which emits a blue laser light with a long wavelength further improves detection accuracy.

In an embodiment, the irregular shaped plates $P_1$ and $P_2$ form a heat exchanging part of a shell-and-plate type heat exchanger, like the circular plates disclosed in Patent Document 1. As shown in FIG. 1, the irregular shaped plates $P_1$ and $P_2$ are provided with inner circle of holes h1 and h2 through which a refrigerant passes, like the above-described circular plates. The inner edges of these circular holes h1 and h2 are aligned by three fixing claws (not shown), so the two irregular shaped plates $P_1$ and $P_2$ to be welded are overlapped.

In an embodiment, as shown in FIG. 3, the first controller 20 stores a torch posture map 60 and a torch orientation displacement speed map 62.

Figure 5A:
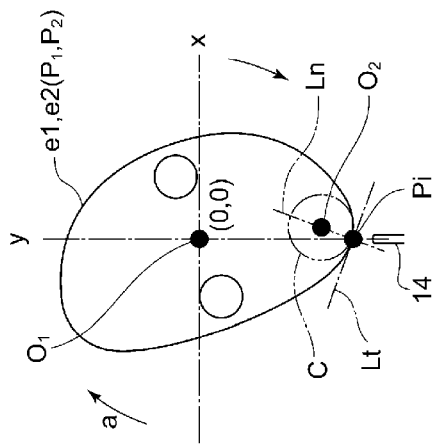
FIG. 5A and FIG. 5B are each an explanatory diagram showing the operation of a welding device according to an embodiment.
Figure 5B:
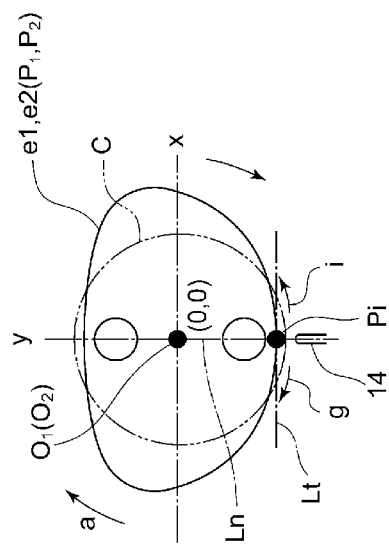

As shown in FIG. 5A and FIG. 5B, the torch posture map 60 uses a two-dimensional coordinate system with x-axis and y-axis. At the origin (0, 0) of the two-dimensional coordinate system, the rotation center $O_1$ of the rotary tables 12a and 12b (i.e., the rotation center of the irregular shaped plates $P_1$ and $P_2$) is located.

Figure 6:
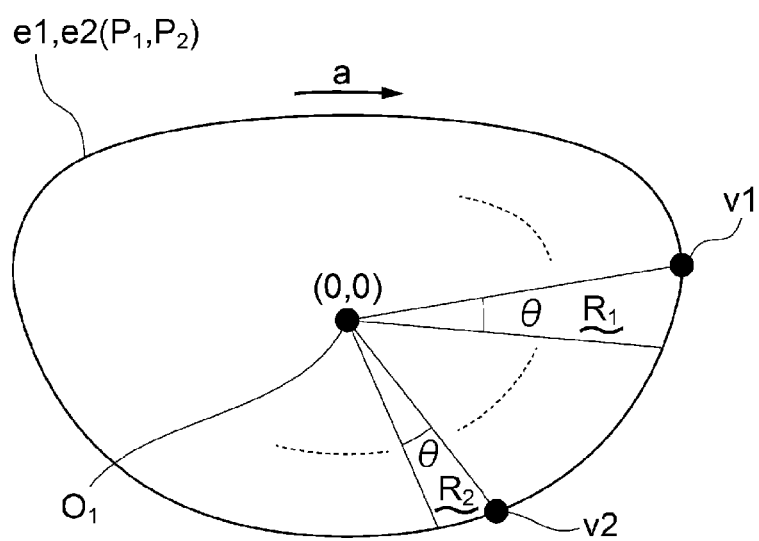
FIG. 6 is an explanatory diagram showing an example of a welding control map of irregular shaped plates.

Then, as shown in FIG. 6, the outer peripheral edges are divided into regions R ($R_1$, $R_2$, ...) distinguished by at least different curvatures of the outer peripheral edges e1 and e2, and the position and the orientation of the welding torch 14 are described by a coordinate for each of setting positions v (v1, v2, ...) of the divided regions. The orientation of the welding torch 14 is set such that it is oriented at the same angle with respect to a tangential line Lt of the outer peripheral edges at every setting position of the regions as shown in FIG. 5A and FIG. 5B.

The torch orientation displacement speed map 62 is a map where the orientation displacement speed of the welding torch 14 is set such that a heating time by the welding torch 14 is constant among the respective setting positions v (v1, v2, ...) of the regions R ($R_1$, $R_2$, ...).

The first controller 20 controls the first torch actuator 18, based on the torch posture map 60 and the torch orientation displacement speed map 62.

Since the position and the orientation of the welding torch 14 are set for each of the regions with different curvatures of the outer peripheral edges e1 and e2 on the basis of the torch posture map 60, as well as the orientation of the welding torch 14 relative to the outer peripheral edges is set so as to have the same angle αt every region, it is possible to reduce welding defects due to the lack of penetration along the circumferential direction of the outer peripheral edges.

The torch orientation displacement speed map 62 where the orientation displacement speed of the welding torch 14 is set such that the heating time by the welding torch 14 is constant among the respective setting positions v (v1, v2, ...) of the regions R ($R_1$, $R_2$, ...) can make the penetration depth uniform along the circumferential direction of the outer peripheral edges, thus reducing welding defects due to the lack of penetration.

The orientation displacement speed of the welding torch 14 can be easily altered by changing the orientation of the welding torch 14 in the same direction or opposite direction to the rotational direction a of the irregular shaped plates $P_1$ and $P_2$.

In an embodiment, as shown in FIG. 5A and FIG. 5B, in the torch posture map 60, the tip of the welding torch 14 is described by a coordinate at an intersection point Pi between the y-axis of the two-dimensional coordinate system and the outer peripheral edges e1 and e2, and an imaginary circle C passing through the intersection point Pi is set. The orientation of the welding torch 14 is set so as to have a constant angle with respect to a normal line Ln passing through the intersection point Pi and a center point $O_2$ of the of the imaginary circle C. FIG. 5A shows a case where the rotation center $O_1$ of the rotary tables 12a, 12b and the center point $O_2$ of the imaginary circle C are coincident; FIG. 5(B) FIG. 5B shows a case where the rotation center $O_1$ of the rotary tables 12a, 12b and the center point $O_2$ of the imaginary circle C are not coincident.

Thus, when the tip of the welding torch 14 is described by a coordinate at the intersection point Pi, the first controller 20 performs control so that the tip of the welding torch 14 is always located at the intersection point Pi at any rotational position of the irregular shaped plates. Consequently, it becomes easy to set the position of the welding torch 14. Further, since the orientation of the welding torch 14 is set so as to have a constant angle with respect to the normal line Ln, the welding torch 14 can be orientated so as to have a constant angle with respect to the tangential line Lt of the outer peripheral edges always. Thus, it is possible to make the penetration depth uniform along the circumferential direction of the outer peripheral edges and reduce welding defects due to the lack of penetration.

In actual welding, the tip of the welding torch 14 is disposed at a position shifted outside of the outer peripheral edges e1 and e2 by a minute distance from the intersection point Pi.

Figures 7A, 7B:
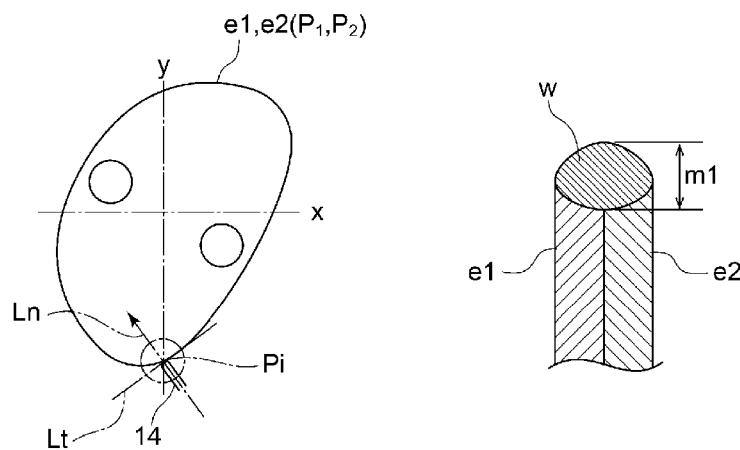
FIG. 7A is an explanatory diagram showing a welding method according to an embodiment.
FIG. 7B is a cross-sectional view of a penetration depth according to the welding method shown in FIG. 7A.

In an embodiment, as shown in FIG. 7A and FIG. 7B, the orientation of the welding torch 14 is set so as to coincide with the normal line Ln. Thus, the welding torch 14 can be positioned perpendicular to the tangential line Lt of the outer peripheral edges, and heat input of the outer peripheral edges can be maximized. Thus, it is possible to maximize the penetration depth of the outer peripheral edges and reduce welding defects due to the lack of penetration.

Figures 8A, 8B:
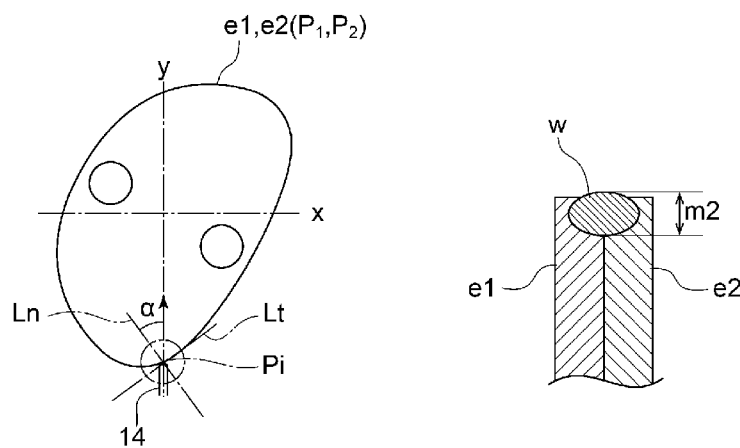
FIG. 8A is an explanatory diagram showing a welding method according to an embodiment.
FIG. 8B is a cross-sectional view of a penetration depth according to the welding method shown in FIG. 8A.

FIG. 7A shows a case (example 1) where the orientation of the welding torch 14 is coincident with the normal line Ln; FIG. 8A shows a case (example 2) where the orientation of the welding torch 14 is not coincident with the normal line Ln and deviated from the normal line Ln at an angle α. In the example 1, since input heat of the outer peripheral edges is maximum, penetration depth m1 of the weld w is maximum, as shown in FIG. 7B. In the example 2, since input heat of the outer peripheral edges is decreased, penetration depth m2 of the weld w is decreased compared with the example 1, as shown in FIG. 8B.

The more regions R ($R_1$, $R_2$, . . . ) the outer peripheral edges are divided into, the more precisely the position and the orientation of the welding torch 14 can be controlled. For instance, if the outer peripheral edges are divided by a central angel θ of less than 1°, the position and the orientation of the welding torch 14 can be controlled more precisely.

The welding torch 14 may be for instance a welding torch used in gas welding in which a material to be welded is heated and welded with a gas welding machine by heat of combustion of an inflammable gas, in arc welding (including plasma welding) in which a material to be welded is melt by generating an arc between the material and the welding torch, or in any other welding method.

In an embodiment, the first controller 20 controls the orientation displacement speed of the welding torch 14 so that a heating time of a potion where stress concentration occurs is exceptionally longer than that of other portions of the outer peripheral edges e1 and e2.

Thus, it is possible to exceptionally increase the penetration depth at the portion where stress concentration occurs. Consequently, it is possible to improve the strength of the weld in the stress concentration portion.

For instance, in the torch orientation displacement speed map 62, the outer peripheral edges e1, e2 are circumferentially divided into regions R ($R_1$, $R_2$, . . . ) by the same central angle, and the orientation displacement speed of the welding torch 14 is set so that a time of heating the stress concentration portion by the welding torch 14 is longer than that of other portions.

The first controller 20 controls the orientation displacement speed of the welding torch 14, based on this torch orientation displacement speed map.

Figure 9:
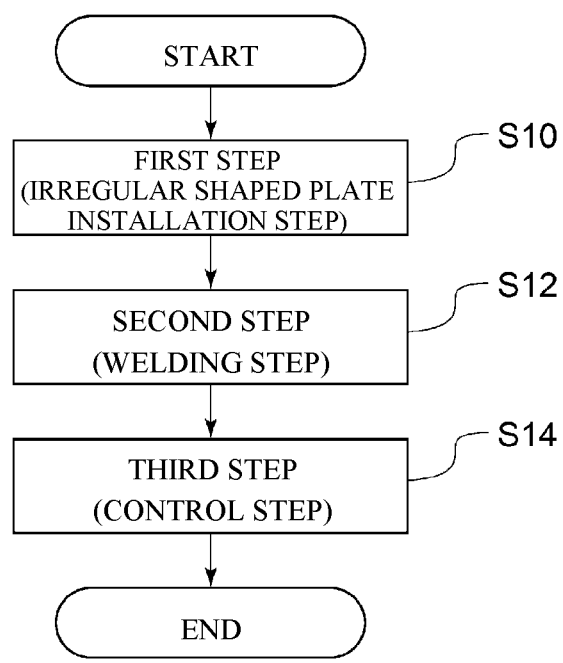
FIG. 9 is a flowchart of a welding method according to an embodiment.

A welding method according to at least one embodiment includes a first step S10, a second step S12, and a third step S14, as shown in FIG. 9.

In the first step (irregular shaped plate installation step) S10, two irregular shaped plates $P_1$ and $P_2$ are overlapped and fixed to the rotary tables 12a and 12b, and the rotary tables 12a and 12b are rotated at a constant rotational speed.

In the second step (welding step) S12, outer peripheral edges e1 and e2 of the two irregular shaped plates $P_1$ and $P_2$ rotating at a constant speed are welded along the circumferential direction by a welding torch 14 positioned to face the outer peripheral edges e1 and e2 of the two irregular shaped plates $P_1$ and $P_2$.

In the second step S12, a control is performed so that an orientation of the welding torch 14 relative to a tangential line Lt of the outer peripheral edges e1 and e2 and a distance of the welding torch 14 from the outer peripheral edges e1 and e2 are kept constant along the circumferential direction of the irregular shaped plates $P_1$ and $P_2$ (the third step (control step) S14).

According to the above method, in the third step S14, the orientation of the welding torch 14 relative to a tangential line of the outer peripheral edges of the irregular shaped plates $P_1$ and $P_2$ which are overlapped and the distance of the welding torch 14 from the outer peripheral edges are controlled so as to be constant along the circumferential direction of the irregular shaped plates. Thus, the lack of penetration does not occur in the circumferential direction of the outer peripheral edges e1 and e2, and welding defects due to the lack of penetration can be reduced.

Further, since the rotary tables 12a and 12b only need to be rotated at a constant speed, it is possible to simplify an actuator of the rotary tables and reduce the cost. In addition, since the welding torch 14 is basically placed at a fixed position relative to the circumferential direction of the outer peripheral edges of the irregular shaped plates, it is unnecessary to provide an actuator for moving the welding torch 14 and it is possible to reduce the cost.

In an embodiment, in the third step S14, as shown in FIG. 6, the position and the orientation of the welding torch 14 are set for each of regions R ($R_1$, $R_2$, . . . ) having at least different curvatures of the outer peripheral edge e1 and e2 in the circumferential direction of the irregular shaped plates $P_1$ and $P_2$, at a setting position v (v1, v2, . . . ) of the corresponding region. Also, this orientation is set so as to have the same angle with respect to a tangential line Lt (see FIG. 5A and FIG. 5B) of the outer peripheral edges at every setting position (v1, v2, . . . ). Further, the orientation displacement speed of the welding torch 14 is set such that a heating time by the welding torch 14 is constant among the setting positions v (v1, v2, . . . ) of the regions R ($R_1$, $R_2$, . . . ).

Thus, it is possible to eliminate the lack of penetration of the weld w along the circumferential direction of the outer peripheral edges e1 and e2, and it is possible to reduce welding defects due to the lack of penetration.

In an embodiment, in the third step S14, the first controller 20 changes the orientation of the welding torch 14 in the same direction (a direction shown by the arrow g in FIG. 5A) as the rotational direction a of the rotary tables 12a and 12b, or changes the orientation of the welding torch 14 in an opposite direction (a direction shown by the arrow i in FIG. 5A) to the rotational direction a of the rotary tables, thus adjusting the orientation displacement speed of the welding torch 14 easily.

In an embodiment, in the third step S14, the orientation displacement speed of the welding torch 14 is controlled so that a heating time of a potion where stress concentration occurs is exceptionally longer than that of other portions of the outer peripheral edges e1 and e2.

Thus, it is possible to exceptionally increase the penetration depth at the stress concentration portion, and it is possible to improve the strength of the weld w of the stress concentration portion.

INDUSTRIAL APPLICABILITY

According to some embodiments, when outer peripheral edges of irregular shaped plates are welded, it is possible to reduce welding defects due to the lack of penetration of the outer peripheral edges. Further, it is possible to simplify the configuration of the welding device which can solve the above problems and reduce the cost. This is beneficial to any welding method for irregular shaped plates.

The invention claimed is:

1. A welding device for welding outer peripheral edges of two overlapping irregular shaped plates each of which has a length from a rotation center, when fixed to a rotary table, to an outer peripheral edge varies in a circumferential direction of said each of the two irregular shaped plates, and the welding device comprising:
the rotary table to which the two overlapping irregular shaped plates are fixed;
a torch unit, including a welding torch positioned to face the outer peripheral edges of the two irregular shaped plates fixed to the rotary table;
a first torch actuator, capable of changing an orientation of the welding torch relative to the outer peripheral edges and a distance of the welding torch from the outer peripheral edges; and
a first controller, configured to control the first torch actuator, so that the orientation of the welding torch relative to a tangential line of the outer peripheral edges and the distance of the welding torch from the outer peripheral edges are kept constant along the circumferential direction of the outer peripheral edges, during rotation of the two irregular shaped plates,
wherein the first controller is configured to control an orientation displacement speed of the welding torch relative to the outer peripheral edges, so that a heating time for heating each of portions of the outer peripheral edges by the welding torch is constant.

2. The welding device according to claim 1, wherein the first controller has:
a torch posture map, in which a position and an orientation of the welding torch are described by a coordinate at a setting position of each of regions of the outer peripheral edges, for each of the regions, in a two-dimensional coordinate system whose origin is the rotation center of the two irregular shaped plates, the regions at least having different curvatures of the outer peripheral edges in the circumferential direction of the irregular shaped plates, wherein the orientation is set so as to have an identical angle with respect to a tangential line of the outer peripheral edges at all of the regions; and
a torch orientation displacement speed map, in which the orientation displacement speed of the welding torch is set, so that a heating time by the welding torch is constant among respective setting positions of the regions, and
wherein the first controller is configured to control the first torch actuator, based on the torch posture map and the torch orientation displacement speed map.

3. The welding device according to claim 2, wherein in the torch posture map,
a tip of the welding torch is described by a coordinate at an intersection point between y-axis of the two-dimensional coordinate system and the outer peripheral edges, and
an imaginary circle passing through the intersection point is set, and the orientation of the welding torch is set so as to have a constant angle with respect to a normal line passing through the intersection point and a center point of the imaginary circle.

4. The welding device according to claim 3, wherein the orientation of the welding torch is set so as to coincide with the normal line.

5. A welding device for welding outer peripheral edges of two overlapping irregular shaped plates each of which has a length from a rotation center, when fixed to a rotary table, to an outer peripheral edge varies in a circumferential direction of said each of the two irregular shaped plates, and the welding device comprising:
the rotary table to which the two overlapping irregular shaped plates are fixed;
a torch unit, including a welding torch positioned to face the outer peripheral edges of the two irregular shaped plates fixed to the rotary table;
a first torch actuator, capable of changing an orientation of the welding torch relative to the outer peripheral edges and a distance of the welding torch from the outer peripheral edges; and
a first controller, configured to control the first torch actuator, so that the orientation of the welding torch relative to a tangential line of the outer peripheral edges and the distance of the welding torch from the outer peripheral edges are kept constant along the circumferential direction of the outer peripheral edges, during rotation of the two irregular shaped plates,
wherein the welding device, further comprises:
a second torch actuator, capable of moving the welding torch in a direction intersecting front and rear surfaces of the two irregular shaped plates;
a third torch actuator, capable of changing the distance of the welding torch from the outer peripheral edges;
a non-contact sensor, configured to detect an overlapped position in the direction intersecting the front and rear surfaces of the two irregular shaped plates and detect the distance of the welding torch from the outer peripheral edges; and
a second controller, configured to control the second actuator and the third actuator, so that a position of the welding torch is matched with the overlapped position in the direction intersecting the front and rear surfaces, and the distance attains a setting value, based on a detection value of the non-contact sensor.

6. The welding device according to claim 5, wherein the non-contact sensor is a laser displacement sensor, and
wherein the second controller is configured to compare the detection value with a master shape stored in the second controller to detect the overlapped position and the distance.

7. The welding device according to claim 5, wherein the first controller is configured to control an orientation displacement speed of the welding torch, so that a heating time for heating a first portion of the outer peripheral edges where greater stress concentration occurs than a second portion of the outer peripheral edges is longer than the second portion.

8. A welding method for welding outer peripheral edges of two overlapping irregular shaped plates each of which has a length from a rotation center, when fixed to a rotary table, to an outer peripheral edge varies in a circumferential direction of said each of the two irregular shaped plates, and the welding method comprising:

fixing the two overlapping irregular shaped plates to the rotary table and rotating the two overlapping irregular shaped plates at a constant rotational speed;

welding the outer peripheral edges of the two irregular shaped plates along the circumferential direction by a welding torch positioned to face the outer peripheral edges of the two irregular shaped plates; and performing a control so that an orientation of the welding torch relative to a tangential line of the outer peripheral edges and a distance of the welding torch from the outer peripheral edges are kept constant along the circumferential direction of the outer peripheral edges during welding the outer peripheral edges, wherein performing the control comprises:

setting a position and an orientation of the welding torch at a setting position of each of regions of the outer peripheral edges, for each of the regions at least having different curvatures of the outer peripheral edges in the circumferential direction of the irregular shaped plates, wherein the orientation is set so as to have an identical angle with respect to a tangential line of the outer peripheral edges at all of respective setting positions of the regions; and setting an orientation displacement speed of the welding torch, so that a heating time by the welding torch is constant among the respective setting positions of the regions.

\* \* \* \* \*